Aug. 2, 1960     A. G. COOLEY     2,947,985

NAVIGATION SYSTEMS

Filed Feb. 6, 1958     2 Sheets-Sheet 1

INVENTOR.
A. G. COOLEY

TRANSMITTING STATION

MOBILE RECEIVING STATION

MILEAGE INDICATOR

INVENTOR.
A.G. COOLEY

United States Patent Office 2,947,985
Patented Aug. 2, 1960

2,947,985

NAVIGATION SYSTEMS

Austin G. Cooley, New York, N.Y., assignor, by mesne assignments, to Digital Control Systems, Inc., Beverly Hills, Calif., a corporation of California Filed Feb. 6, 1958, Ser. No. 713,633

7 Claims. (Cl. 343—105)

The present invention relates to radio navigation systems and more particularly to a long-range distance measuring system for indicating the position of aircraft or the like with a high degree of accuracy.

Prior systems for indicating position to the pilot or observer have been relatively complicated, usually requiring a plurality of spaced transmitting stations, for example. The radiation from these stations must be accurately controlled as to frequency or phase, and in most cases is effective only on a prearranged schedule so that operating time is shared with different stations working on an intermittent or cyclic basis. Where more than one frequency is employed, it is difficult to maintain the exact ratio of frequencies and the system is wasteful of spectrum space in the useful portion of the radiant energy spectrum.

In general terms, the object of the present invention is to overcome these drawbacks of prior systems; provide a system which is easy to use and maintain for indicating directly the distance between the aircraft and a fixed reference station; and reduce the spectrum space required to a minimum.

Another object of the invention is to provide an improved radio navigation system of this character which does not require an RF transmitter on the aircraft or mobile station.

Another object of the invention is to provide a system which does not require enough power for a signal to be reflected back to the remote transmitting station.

Another object of the invention is to provide a measuring system of the character described which does not require continuous reception of the signal but which on the contrary may be left "off" until distance indication is desired.

A further object of the invention is to provide a distance measuring system of the radio-controlled type having indicating means of the direct-reading type; i.e., including a display device calibrated in distance units-miles or kilometers. Furthermore, this direct-reading indicator is preferably capable of continuous operation to provide a continuous indication of the changing distance between the mobile station and the remote fixed reference station or point.

Figure 1:
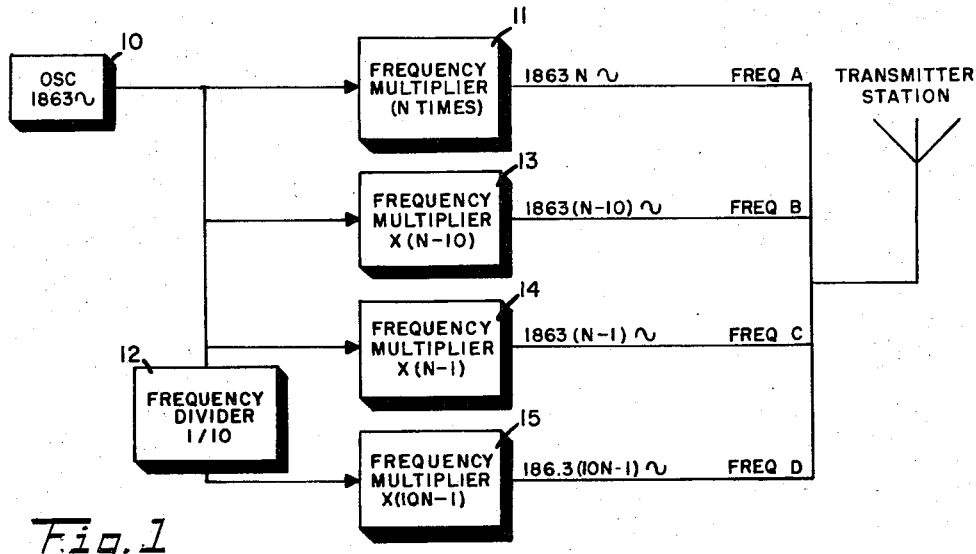
Figure 2:
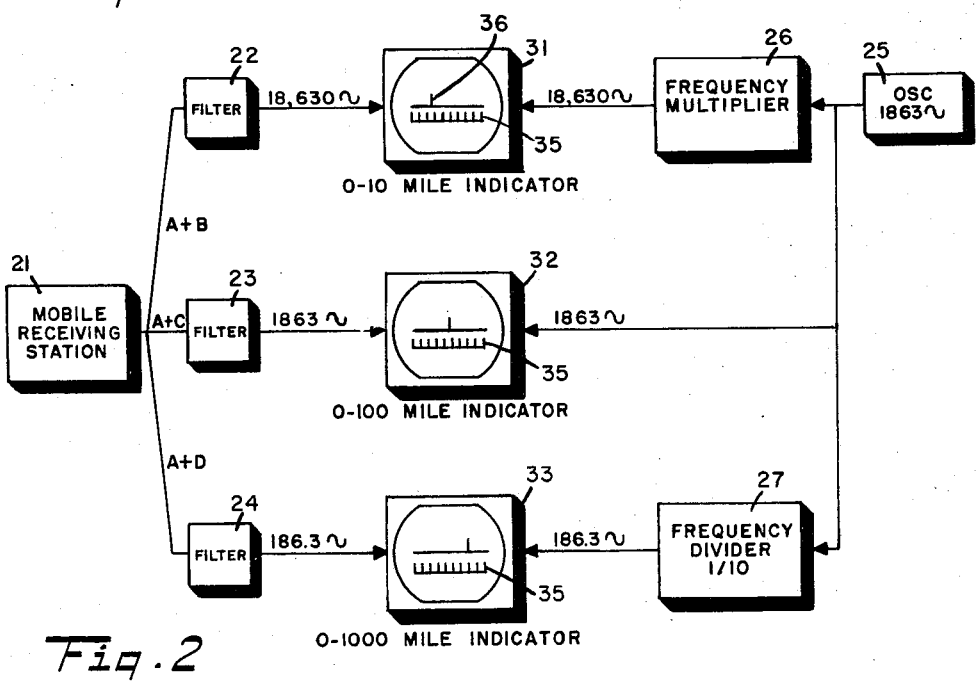
Figure 3:
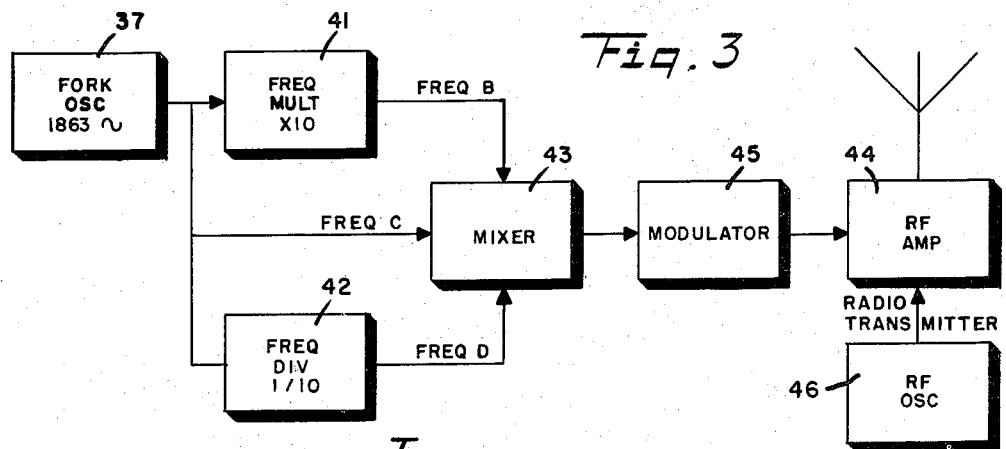
Figure 4:
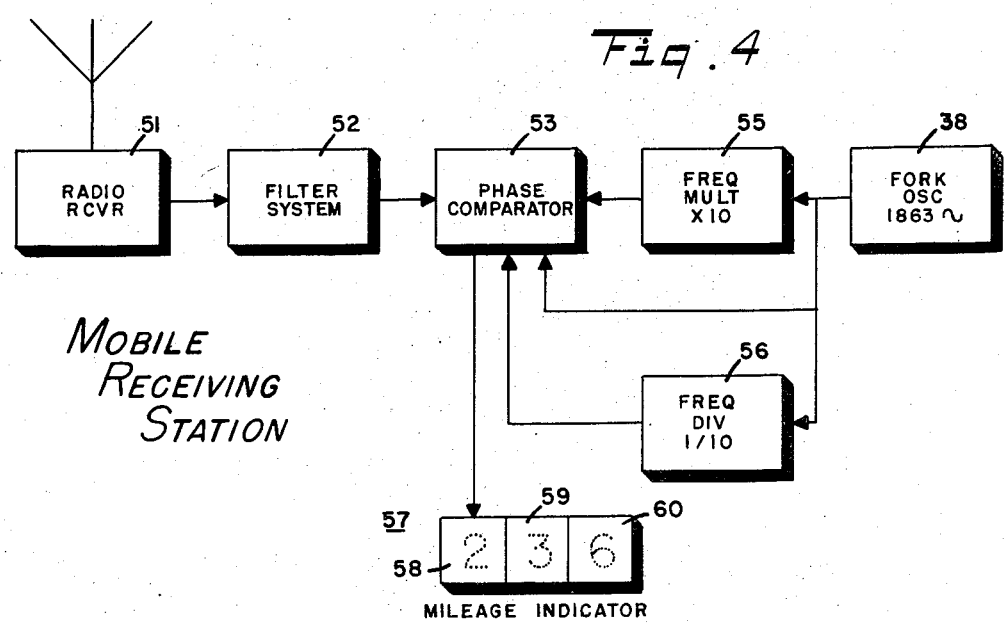

Other objects and advantages of the invention will appear from the following description of the preferred embodiments thereof shown on the accompanying drawings, in which:

Figs. 1 and 2 are diagrammatic views of the fixed and mobile stations of a system according to the invention; and Figs. 3 and 4 are similar views of a modification.

This invention is intended to provide a navigational aid for the pilot of aircraft or other mobile units such as ships. It does not contemplate a system for determining position in terms of both coordinates of position but rather an arrangement for continuously measuring and/or indicating the distance between the craft and the fixed reference point or station. In accordance with the invention, the distance of the mobile craft from the fixed reference position is indicated by providing at the fixed reference point or station and on the mobile craft respectively two frequency sources of high stability. A radio wave is transmitted from the fixed station which is modulated at such a frequency that when received and compared with a local signal of the proper frequency on the aircraft, the changing phase relation between the two due to the travel time of the radio wave is a function of the distance between the transmitting and receiving points and may be utilized to control a distance indicator in a manner to be described.

Referring to Figs. 1 and 2, a fixed frequency oscillator 10 is provided at the transmitting station. For purposes of simplicity in describing this invention it is assumed that the rate of travel of radio waves is 186,300 miles per second. If the distance is to be indicated in miles, the frequency of the oscillator 10 may be 1,863 cycles. In order to obtain good frequency stability which is necessary for the proper functioning of the system, the oscillator 10 may comprise a temperature-compensated tuning fork designed for maximum possible frequency stability, such as the type FK-5 fork oscillator manufactured by Times Facsimile Corporation. In the system shown the output of the oscillator 10 is multiplied in the frequency multiplier 11 to obtain a radio frequency carrier of 1863N cycles per second. A frequency divider 12 and additional frequency multipliers 13, 14 and 15 are connected as shown to obtain output frequencies of $1863 \times (N-10)$ cycles, $1863 \times (N-1)$ cycles and $186.3 \times (10N-1)$ cycles. Thus, a plurality of constant-frequency signals are radiated from the fixed transmitting station or location. If N=1000, the frequencies of these signals may for example be A=1,863,000 cycles, B=1,844,370 cycles, C=1,861,137 cycles and D=1,862,813.7 cycles. In this manner synthesized single sideband signals are generated consisting of the carrier and the lower sideband only, corresponding to modulation rates of 18,630 cycles, 1,863 cycles and 186.3 cycles. If it is desired to indicate the distance in kilometers or knots instead of miles, the fixed frequencies are altered in a suitable radio (miles/kilometers).

At the mobile receiver 21 on the aircraft, the radiated signals from a transmitter are detected and amplified. In a system employing the four signals as shown, three filters, 22, 23 and 24 are provided for separating each signal in the manner indicated. A local oscillator 25 of high frequency stability similar to the oscillator 10 is provided for deriving a local signal with which the receiver signals may be compared. Frequencies of 18,630 cycles, 1863 cycles and 186.3 cycles are derived from the oscillator 25 by the use of a frequency multiplier 26 and a frequency divider 27 as shown.

In one form of distance indicator according to the invention, the local signal frequencies are compared with the received frequencies by means of three oscilloscopes or CR tubes 31, 32 and 33. These tubes may be used to indicate the phase relation between the local and received signals in any suitable manner. For example, the local frequencies may be employed to control the sweep circuit of the CR tube and the received signals impressed as a sharp pulse or pip on the vertical deflection circuit of the tube. The screen of each oscilloscope may carry a ten line calibrating pattern 35 as indicated. Then the position of the pip 36 in relation to the screen image will indicate miles, tens of miles and hundreds of miles, respectively, on the three oscilloscopes.

In operation, the phase of the oscillator 25 on the mobile craft is adjusted in accordance with the known distance of the craft from the transmitter station at the commencement of the flight or trip. Then as the craft leaves or approaches the transmitting reference point, the change in the phase of the received signal provides a continuous distance indication showing the actual distance between the craft and the fixed reference point. The accuracy of the system obviously depends upon the amount of frequency drift of either oscillator 10 or 25 over a period of time. Since fork oscillators having a frequency stability of one part in one hundred million over a period of several hours are available, it is possible to obtain the necessary accuracy for a long flight by the use of such oscillators.

In the system shown in Figs. 3 and 4, similar oscillators 37 and 38 of high frequency stability are employed at the transmitting and receiving points respectively. In this system also three frequencies B, C and D are derived from the oscillator 37 by a frequency multiplier 41 and a frequency divider 42 as shown. These frequencies are combined in a mixer 43 and used to modulate the output of the radio-frequency amplifier 44 by a modulator 45. The usual RF oscillator is indicated at 46. As in the system shown in Fig. 1, the continuous wave signal or carrier radiated from the transmitting station comprises three constant-frequency components of frequencies B, C and D.

At the mobile receiving station, Fig. 4, the constant-frequency signals from the transmitter are detected and amplified in the receiver 51, separated by a filter system 52 and impressed upon a phase comparator 53. A switching commutator (not shown) may be employed if desired to connect the signal frequencies (B, C, and D) one at a time to the phase comparator 53, and at the same time the corresponding frequencies derived from the local oscillator 38. As explained above, these frequencies may be 18,630 c.p.s., 1863 c.p.s. and 186.3 c.p.s. If the frequency of the oscillator 38 is 1863 c.p.s, the other frequencies are obtained by using a frequency multiplier 55 and a frequency divider 56, as shown.

The phase comparator 53 may be of any suitable type known in the art, such as the type 320-AB phase meter manufactured by Technology Instrument Corporation. This instrument provides an output potential or voltage which varies directly with the difference in phase between the two frequencies B, C or D being compared at any instant, and which controls the indicator 57 consisting in this case of units (B), tens (C) and hundreds (D) indicators 58, 59 and 60, respectively. Since the phase relation between the local and received signals varies with the distance between the mobile station and the fixed transmitting station, a continuous direct-reading indication is provided by the display unit 57 of the distance in miles (or kilometers). The indicators 58—60 of the display unit are of any conventional type arranged to indicate the magnitude of the voltage derived from the comparator 53 from minimum to maximum (0–9).

It will be apparent that the invention provides a reliable means for measuring the travel time of the signal radiated by the transmitter and translating the same into a direct-reading distance indication. No adjustment of the controls is required after the initial phasing of the receiving oscillator and the tuning of the radio receiver While two separate embodiments of the invention have been described for the purpose of explaining the underlying principles thereof, various modifications will occur to those skilled in the art and may be made without departing from the spirit and scope of the invention as defined in the appended claims.

I claim:

1. In a radio navigation system, the combination of a low-frequency oscillator, means controlled by said oscillator for radiating two constant-frequency continuous wave RF signals from a fixed location, a constant-frequency source at a mobile receiving station, means including said source for generating a third signal having the same frequency as the difference between said radiated continuous wave RF signals, a signal detector at said mobile receiving station and means including said detector to indicate the distance between said fixed location and said mobile receiving station by comparison of the instantaneous phase relation between the difference wave signal as received and said third signal.

2. In a radio navigation system, the combination of means for radiating a constant-frequency continuous wave signal from a fixed location, said wave signal comprising interlocked constant-frequency components of frequencies equal to $K \times 100$ c.p.s., $K \times 10$ c.p.s. and $K$ c.p.s., where 1000K equals the distance travelled by radio waves in one second, a constant-frequency source at a mobile receiving station, means including said source for generating a local second signal comprising constant-frequency components of the same frequencies as the first-mentioned components, means at said mobile receiving station for receiving the radiated wave signal from the fixed location and means to indicate continuously the changing distance between said fixed location and said mobile receiving station in unit miles or kilometers by comparison of said local and receiving signal components.

3. A navigation system according to claim 2, in which the indicating means comprises an electrically operated display device calibrated in distance units, e.g., miles or kilometers, to provide a direct-reading distance indicator.

4. In a radio navigation system, the combination of means for radiating a constant-frequency continuous wave RF signal from a fixed location, said RF signal comprising a plurality of interlocked constant-frequency components of predetermined frequencies, a constant-frequency source at a remote point of which the distance from said fixed location is to be determined by the travel time of said wave signal, means at said remote point for receiving the radiated wave signal from said fixed location, visual indicating means and means including said constant-frequency source and said receiving means to operate said indicating means to provide an indication of said distance.

5. A radio navigation system according to claim 4, in which means is provided for deriving a plurality of constant-frequency signals from said constant-frequency source, each corresponding to one of the constant-frequency components of the radiated wave signal.

6. A radio navigation system according to claim 4, in which the visual indicating means consists of cathode ray tubes.

7. A radio navigation system according in claim 4, in which the visual indicating means consists of a phase comparator and display unit.

References Cited in the file of this patent

UNITED STATES PATENTS

| | | |
|---|---|---|
| 2,144,203 | Shanklin | Jan. 17, 1939 |
| 2,248,727 | Strobel | July 8, 1941 |
| 2,838,753 | O'Brien | June 10, 1958 |
| 2,843,846 | Hawkins | July 15, 1958 |